Oct. 19, 1926. 1,603,376
P. C. COLONY
TRANSPARENCY AND MOUNTING THEREFOR
Filed June 23, 1924 2 Sheets-Sheet 1
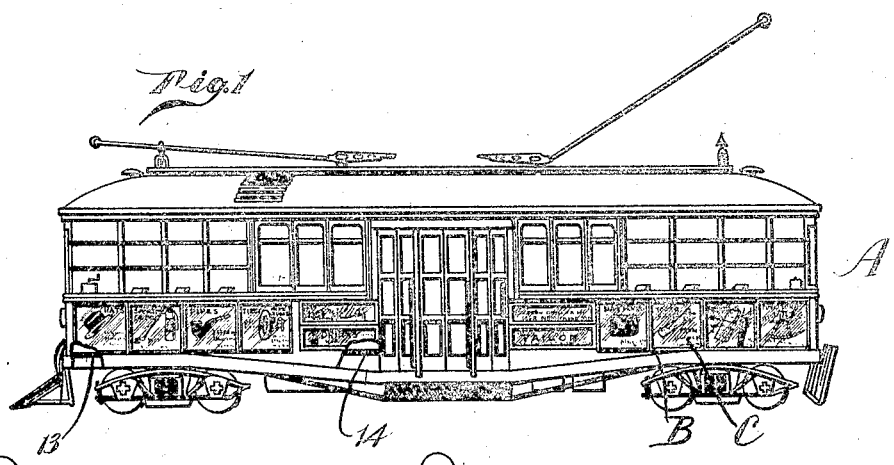
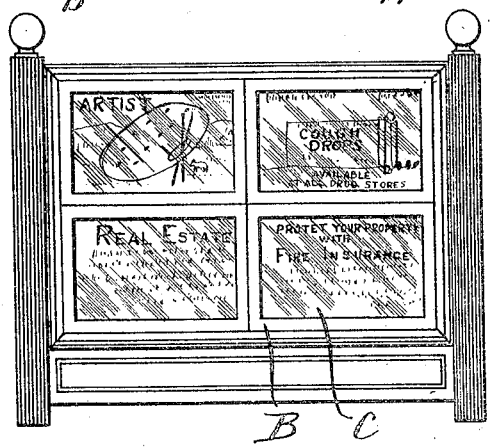
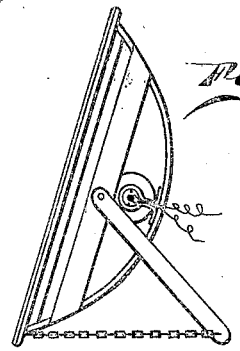
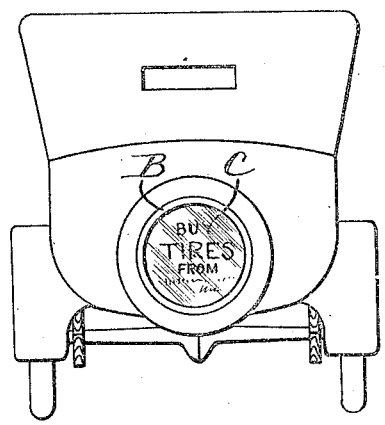
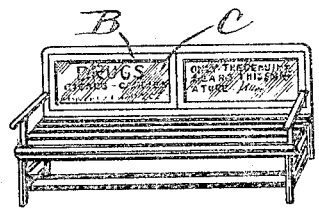
INVENTOR,
Pearl C. Colony;
BY
Blakeslee Brown,
ATTORNEYS.

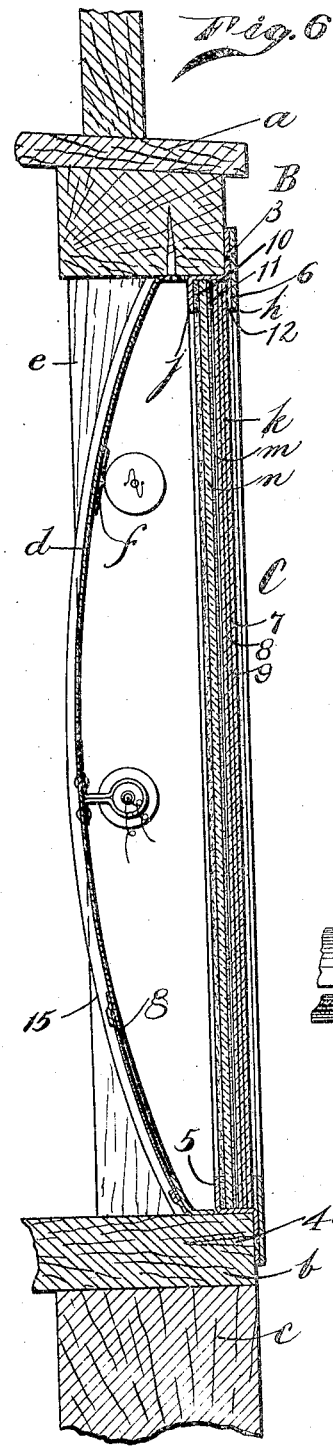
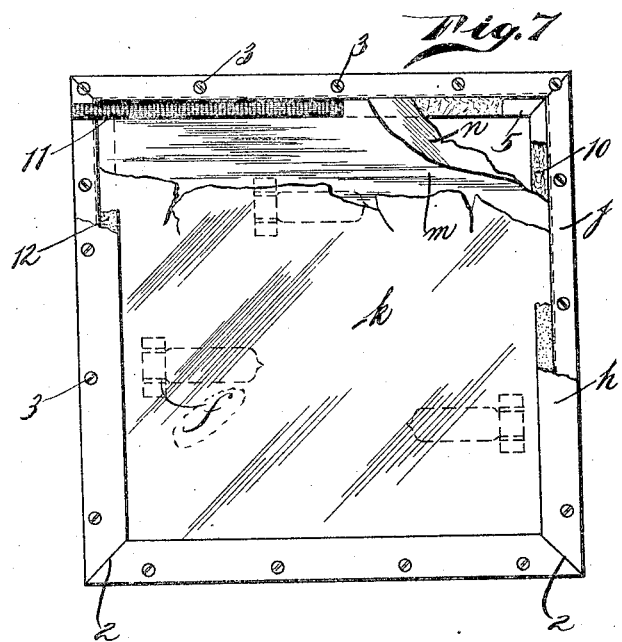
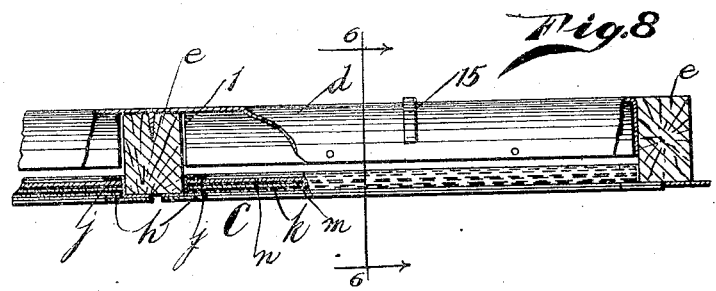

Patented Oct. 19, 1926.

1,603,376

UNITED STATES PATENT OFFICE.

PEARL C. COLONY, OF LOS ANGELES, CALIFORNIA.

TRANSPARENCY AND MOUNTING THEREFOR.

Application filed June 23, 1924. Serial No. 721,824.

This invention relates to transparencies and mountings therefor and has particular application for use in advertising purposes, whether it be for bill boards or vehicles. The invention has for an object the provision of a novel form of mounting for a transparency which is rattle proof, dust proof, which may be easily assembled, and in the case of vehicles such as street cars, does not change the construction of such street car materially. The invention is so constructed and formed that vapor is prevented from condensing upon parts of the same so as to spoil the general effect of any transparency within the mounting.

With the above and other objects in view, the invention consists in the novel and useful provision, formation, construction, association and relative arrangement of parts, members and features, all as shown in certain of its embodiments in the accompanying drawings, described generally and more particularly pointed out in claim.

In the drawings:

Figures 1 to 5 inclusive illustrate various applications of the invention;

Figure 6 is an enlarged cross sectional view showing the invention as applied to the sides of a street car shown in Figure 1, said view being taken on the line 6—6 of Fig. 8;

Figure 7 is a fragmentary face view on a reduced scale of the showing of Fig. 6; and, Figure 8 is a fragmentary top plan view of the showing of Fig. 6, said view being on a reduced scale.

Corresponding parts in all the figures are designated by the same reference characters.

Referring with particularity to the drawings, I have illustrated in the first five figures various adaptations of the invention, one of the adaptations being for a street car such as shown in Figure 1, and this form of street car may be designated as an advertising street car, in that advertisements may be placed on the street car so as to be visible exteriorly of such street car. As mere pasteboard signs would detract from the appearance of the street car, it is intended that the signs be of such a nature as to present a pleasing appearance. To incorporate suitable advertising media on a street car it is required that such media be enclosed in suitable frames and protected and likewise illuminated so that the advertisements would be visible at night. The same would be true for a bill board such as shown in Figure 2, or for that matter for a vehicle such as an automobile shown in Figure 4, it being intended that the space normally included within the tire rim would be utilized for advertising or other purposes. In Figure 3 I have shown a stand for placement in a window for advertising purposes, and in Fig. 5 an ordinary bench, the back of which is adapted to be illuminated by any suitable means. In any adaptation of the invention it is essential that the transparencies, whatever they may be, whether they illustrate a sign or whether they contain mere words, should be quickly interchangeable and, in the case of vehicles, any covering for the transparency should be rattle-proof and dust-proof, and should not entail great expense in the provision of the frame members. To change the outside of a street car, as shown in Fig. 1, might under ordinary conditions result in considerable expense, as the bracing and other frame work might have to be changed; however, with my invention it is only necessary to remove portions of the outer sheathing of the street car and insert a reflector and then place the novel form of mounting in front of such reflector. Thus it is unnecessary to tie up for any considerable length of time any one street car, as the work can be performed very quickly and the frames manufactured or stamped from metal in a short time and made ready for use. The invention has been shown as applied for use in a street car in Figures 6 to 8 inclusive, and it is of course to be understood that the invention lends itself to various shapes and adaptations other than for use on a street car.

In Figure 6 the sash is shown at *a* and the base-board at *b*, said base-board *b* being mounted upon a stringer shown at *c*. It is noted that these parts of the street car shown in Figure 1 are designated by A.

The sheathing included between the sill or sash *a* and the base-board *b* would be removed and upon the removal of such sheathing a reflector *d* would be inserted between said sash and the base-board. It is noted that the reflector would be cut away, as shown at 1 in Fig. 8, so as to accommodate the uprights *e*, of which there is a plurality, and which uprights are between the sash *a* and the base-board *b*. This reflector may have suitably mounted within the same incandescent lights *f*, and said reflector may likewise carry a slide door or gate *g*, so that access may be had within the reflector for the purpose of replacing burnt-out bulbs. The mounting adapted for placement in front of the reflector *d* is designated as an entirety by B, and includes outer and inner frame members *h* and *j* respectively. The outer frame member *h* is straight-sided, while the inner frame member *j* is substantially Z-shaped. It is to be understood that such respective frame members are made up in sets; that is to say, they include top and bottom pieces and side pieces, such as shown in Fig. 7, the meeting end portions of such pieces being given a diagonal cut, as shown at 2. The outer and inner frame members are adapted to be united as by means of screws, as shown at 3. In the adaptation shown in Figure 6 the frame member *j* is secured to the uprights *e*, as well as the sash *a* and the base-board *b* by suitable means such as wood screws shown at 4. The formation of the inner frame member *j* is such as to provide a flange 5, and when the outer frame member *h* is secured to the inner frame member *j* the latter will have a part as shown at 6 which acts as a second flange. Between such flanges are placed the transparency and cooperating parts designated as an entirety by C, and constituting an exhibiting panel unit which includes members *k*, *m*, and *n*. The member *k* which constitutes a protector may be made of unbreakable glass, such glass comprising a series of thin sheets of glass as shown at 7, 8 and 9, with gelatine between said sheets, the sheets of glass being united under pressure. The resultant member *k* becomes what is known as unbreakable glass or non-shatterable glass. The transparency *m* may comprise a treated printed paper upon which is depicted an advertisement or picture of whatever it is desired to show. This transparency may be sensitized photographic paper given an oil finish. Back of such transparency is a light diffusing member *n* which may be translucent glass. Included between the flange 5 and the glass *n* is a felt gasket 10 and included between the transparency and the member *k* is a thin strip of canvas or the like 11. As shown in Fig. 7 the canvas strip is of a length sufficient to overlap the inner frame member. Interposed between the flange 6 of the outer frame member *h* and the member *k* is a felt gasket 12. It will be noted that in actual assemblage the glass member *n* may be always in position and if it is desired to remove the transparency from between the members *k* and *n* it is only necessary to remove the outer frame member by releasing the securing means 3, and by grasping the ends of the canvas strip 11 to withdraw from such frame member *j* the transparency and the member *k*. The transparency may easily be removed and a new one inserted, according to usage and requirement. It will thus be seen that all the parts such as shown at *k*, *m* and *n* are tightly held between the flanges of the frame members so that there is little chance of rattle in such members. The frame members and the method of assembling the transparency would be the same for the adaptations of the invention shown in Figures 2 to 5 inclusive, although the general shape of the transparency or the frame members might vary; the general principle is to provide suitable illuminating means back of the transparency so that the transparency may be readily viewed. A treated transparency will of course diffuse the light and the bulb members *f* would not be readily distinguished through the transparency.

A further feature of the invention resides in the provision of ventilating screens shown at 13 and 14 for the street car A. These ventilating screens communicate directly with the interior of the reflector *d*, and as a result any moisture in the air is prevented from condensing upon the member *k*, which would prevent a clear view of the transparency through such member. This ventilating medium might be applied to the device shown in Figs. 2 to 5 inclusive, and for the same purpose.

The reflector *d*, where it is of considerable length, may be suitably reinforced as by means shown at 15.

It is obvious that various changes and modifications may be made in practicing the invention, in departure from the particular showing of the drawings and the description as given, without departing from the true spirit of the invention.

Having thus disclosed my invention, I claim and desire to secure by Letters Patent:

An advertising device for street cars or the like including a mounting for placement in front of a reflector and comprising inner and outer frame members one having a seat and an attaching flange and the other being straight sided, the outer straight member overlying and contacting the attaching flange of the seat member, the outer member paralleling the seat of said inner member and spaced therefrom to form a housing, the transparency arranged in said housing and having a light diffusing member at the back thereof, and a protector in front, a fabric strip arranged between said transparency and the said protector and having one end overlapping the outer flange of the inner member to facilitate the removal of the transparency when desired, and a gasket located between said light diffusing member and the adjacent wall of said inner member.

In testimony whereof, I have signed my name to this specification.

PEARL C. COLONY.